United States Patent
Stroomer et al.

(10) Patent No.: US 11,015,042 B2
(45) Date of Patent: May 25, 2021

(54) TREAD ENHANCEMENT ADDITIVES FOR TIRES

(71) Applicant: KRATON POLYMERS LLC, Houston, TX (US)

(72) Inventors: Johan Stroomer, Almere (NL); Hannes Hendrik Peter van Erp, Almere (NL); Wolfgang Pille-Wolf, Almere (NL); Jochem Hendrik Willem Vervelde, Almere (NL)

(73) Assignee: Kraton Polymers LLC, Houston, TX (US)

( * ) Notice: Subject to any disclaimer, the term of this patent is extended or adjusted under 35 U.S.C. 154(b) by 59 days.

(21) Appl. No.: 16/379,920

(22) Filed: Apr. 10, 2019

(65) Prior Publication Data
US 2019/0322844 A1    Oct. 24, 2019

Related U.S. Application Data

(60) Provisional application No. 62/659,742, filed on Apr. 19, 2018.

(51) Int. Cl.
| | |
|---|---|
| *C08L 9/06* | (2006.01) |
| *C08J 3/20* | (2006.01) |
| *C08J 3/24* | (2006.01) |
| *B60C 1/00* | (2006.01) |
| *B60C 11/00* | (2006.01) |
| *C08L 65/00* | (2006.01) |
| *C08L 61/14* | (2006.01) |

(52) U.S. Cl.
CPC ............. *C08L 9/06* (2013.01); *B60C 1/0016* (2013.01); *B60C 11/0008* (2013.01); *C08J 3/203* (2013.01); *C08J 3/24* (2013.01); *C08L 61/14* (2013.01); *C08L 65/00* (2013.01); *C08L 2205/025* (2013.01); *C08L 2205/035* (2013.01); *C08L 2205/06* (2013.01); *C08L 2312/00* (2013.01)

(58) Field of Classification Search
CPC ........ C08G 61/02; C08G 14/04; C08G 14/12; C08L 65/00; C08L 61/14
See application file for complete search history.

(56) References Cited

U.S. PATENT DOCUMENTS

| | | | |
|---|---|---|---|
| 2012/0225233 A1* | 9/2012 | Guy | C08K 3/36 428/36.9 |
| 2015/0218305 A1* | 8/2015 | Washizu | C08G 61/02 523/156 |
| 2017/0327670 A1* | 11/2017 | Miyazaki | C08K 3/00 |
| 2018/0105681 A1* | 4/2018 | Pille-Wolf | C08L 9/06 |

FOREIGN PATENT DOCUMENTS

| | | | | |
|---|---|---|---|---|
| CN | 105254854 A | * | 1/2016 | |
| EP | 2103650 B1 | | 8/2012 | |
| EP | 2270088 B1 | | 5/2013 | |
| EP | 1913075 B1 | | 12/2014 | |
| EP | 2440611 B1 | | 7/2016 | |
| FR | 1355165 A | | 3/1964 | |
| JP | 2011111489 A | | 6/2011 | |
| WO | WO-2015051402 A1 | * | 4/2015 | ............. C07C 41/06 |
| WO | WO-2016104142 A1 | * | 6/2016 | ............... C08L 9/00 |

OTHER PUBLICATIONS

Google Patents translation of CN 105254854 (2016, 10 pages).*

* cited by examiner

*Primary Examiner* — Brieann R Johnston

(57) ABSTRACT

A composition comprising a tread enhancement additive for use in a number of applications including tires is disclosed. The tread enhancement additive is prepared from an unmodified alkyl phenol resin by reducing the hydroxyl value of the unmodified alkyl phenol resin, forming a modified alkyl phenol resin having a decreased hydroxyl value. The composition exhibits improved performance characteristics such as enhanced wet grip and decreased rolling resistance and improved abrasion resistance.

20 Claims, No Drawings

TREAD ENHANCEMENT ADDITIVES FOR TIRES

RELATED APPLICATIONS

This application claims priority from U.S. Application No. 62/659,742, with a filing date of Apr. 19, 2018, the disclosures is incorporated herein by reference.

FIELD

The present disclosure relates to modified alkyl phenol resins for use in improved performance tires.

BACKGROUND

Tires, as a vehicle's sole link with the roadway, play a key role in automotive safety and also have an indirect influence on fuel consumption, as well as many other characteristics. Rubber tires, such as those used in transportation, are conventionally prepared with a rubber tread. Such rubber tread is often composed of a specified rubber composition. Some desired attributes of high performance tires include superior wet grip (wet traction) and superior rolling resistance, e.g., the force resisting the motion when a tire rolls on the surface. While dry grip is usually maintained by many rubber compositions, wet grip is not. Rubber compositions having good wet grip improve wet skid resistance but suffer from an increase in rolling resistance, the latter of which contributes to decreased fuel economy.

Terpene phenol resins are known to be used in rubber compositions for tire treads. There exists an ongoing need for improved rubber compositions capable of providing properties suitable for the fabrication of high performance tires.

SUMMARY

In one aspect, a tread enhancement additive (TEA) is disclosed. The TEA comprises a modified alkyl phenol resin wherein the modified alkyl phenol resin is prepared by reducing a hydroxyl value of an unmodified alkyl phenol resin. The composition further comprises a filler, a coupling agent, a plasticizer component, cross-linking agents and other additives.

In one aspect, the modified alkyl phenol resin is an alkylated phenol ether resin.

DESCRIPTION

The following terms will be used throughout the specification and will have the following meanings unless otherwise indicated.

"TEAs" or tread enhancement additive refer to chemical compound(s) used in formulating tire tread compounds to improve visco-elastic properties.

"phr" means parts per hundred parts of elastomer (rubber).

"Elastomer" may be used interchangeably with the term "rubber," referring to any polymer or combination of polymers consistent with ASTM D1566 definition.

"Polymer" and "interpolymer" are used interchangeably to mean higher oligomers having a number average molecular weight (Mn) equal to or greater than 100, prepared by the polymerization or oligomerization of at least two different monomers, including copolymers, terpolymers, tetrapolymers, etc.

$M_w$ describes the molecular weight average distribution calculated according to:

$$M_w = \frac{\Sigma_i N_i M_i^2}{\Sigma_i N_i M_i}$$

where $N_i$ is the number of molecules of molecular weight $M_i$. One method to calculate the $M_w$ is determined using gel permeation/size exclusion chromatography (GPC-SEC) as described in ASTM D5296 (2005).

$M_n$ is the number average of the molecular weights, calculated according to:

$$M_n = \frac{\Sigma_i N_i M_i}{\Sigma_i N_i}$$

where $N_i$ is the number of molecules of molecular weight $M_i$. One method to calculate $M_n$ is determined using the GPC-SEC method in ASTM D5296 (2005).

$M_z$ is a higher order molecular weight average, or the third power molecular weight, which is calculated according to:

$$M_z = \frac{\Sigma_i N_i M_i^3}{\Sigma_i N_i M_i^2}$$

where $N_i$ is the amount of substance of species i and $M_i$ is the molecular weight of species i. One method to calculate $M_z$ is determined using GPC-SEC method in ASTM D5296 (2005).

Polydispersity index (PDI) is calculated according to: $PDI = M_w/M_n$ $T_{sp}$ (softening point) may be determined by ASTM E28, or a ring and ball, or cup and ball (C+B) softening point tests, or ASTM D 6090 Cup and Ball.

Differential Scanning calorimetry (DSC): The glass transition temperature $T_g$ of the resinous materials can be determined according to ASTM D 6604 between 0° C. and 200° C. and a heat up rate of 10° C./min.

Wet traction and rolling resistance indicators can be determined by utilizing dynamic mechanical analysis. One method of characterizing viscoelastic polymeric materials is by measuring its complex modulus, $E^* = E' - E''$, where E' and E'' are generally referred to as the storage modulus and loss modulus, respectively. The magnitude of the complex modulus, $|E^*|$, is defined as $[(E')^2 + (E'')^2]_m$, and also represents the ratio of maximum stress to maximum strain ($\sigma^0/\varepsilon^0$). Measurement of the storage modulus and loss modulus allow comparisons of the materials ability to return energy to its ability to lose energy. The storage modulus E' and loss modulus E'' may be measured by dynamic mechanical analysis (DMA).

The storage modulus E' is associated with energy storage and release during periodic deformation. The loss modulus E'' is associated with the dissipation of energy and its transformation into heat. The ratio of these effects (E''/E') is tan δ, where δ is the phase angle between the applied force and the materials response to that force. The parameter tan δ is widely used as a measure of the damping capacity of viscoelastic materials. As stress is removed from elastomers and they return to their original shape, the movement is exothermic resulting in energy loss that dampens the rebound. Materials with a larger tan δ have a larger loss modulus and consequently dampen the rate of rebound.

Determination of tan δ can be carried out by DMA in temperature-sweep/mode in double shear mode from −60° C. to +100° C. with a heat rate of 1° C./min at 10 Hz and a dynamic strain of 0.1% (from −60° C. to −5° C.) and a dynamic strain of 3% (from −5° C. to 100° C.) using a Metravib +450N. Out of this measurement, the wet grip indicator commonly used is tan δ at 0° C. (tan δ 0° C.) and the rolling resistance indicator commonly used is tan δ at 60° C. (tan δ 60° C.).

Hydroxyl value (OHV) is a measure of the content of free hydroxyl groups, expressed in units of the mass of potassium hydroxide (KOH) in milligrams equivalent to the hydroxyl content of one gram of the chemical substance, determined per ASTM E222.

Properties such as tensile strength, elongation, and modulus can be measured following procedures described in ISO 37.

DIN abrasion resistance can be measured according to ISO 4649.

Hardness refers to Hardness Shore A according to DIN 53506.

Mooney viscosity MS or ML (1+4) at 100° C. is according to DIN 53523.

"phr" means parts by weight per hundred parts of elastomer or rubber.

Disclosed herein are rubber compositions comprising an elastomer (e.g., rubber) and a tread enhancement additive (TEA) comprising a modified alkyl phenol resin. The modified alkyl phenol resin is prepared by reducing OH groups of an unmodified alkyl phenol resin via a post polymerization modification to covert phenolic OH groups of the unmodified alkyl phenol resin to an ether-group with an alkylating agent, thereby reducing the OH groups present by at least 20%.

First Resin—Modified Alkyl Phenol Resin:

The TEA comprises a modified alkyl phenol resin, wherein the phenolic OH group of an unmodified alkyl phenol resin is converted via a post polymerization modification to an ether group by Williamson ether synthesis, reducing the number of free hydroxyl groups present in the molecule. In one embodiment, the alkyl moiety comprises terpenyl and the modified alkyl phenol resin is referred to as a terpenyl phenol ether resin, terpene phenol ether, or TPE, although other alkyls are disclosed and contemplated herein.

Examples of the resin to be modified include substituted or unsubstituted units derived from cyclopentadiene homopolymer or copolymer resins (referred to as CPD), dicyclopentadiene homopolymer or copolymer resins (referred to as DCPD or (D)CPD), terpene homopolymer or copolymer resins, rosin derived resins, rosin/rosin esters, pinene homopolymer or copolymer resins, C5 fraction homopolymer or copolymer resins, C9 fraction homopolymer or copolymer resins, alpha-methyl styrene homopolymer or copolymer resins, and combinations thereof. In one embodiment, the resin may further include units derived from (D)CPD/vinylaromatic copolymer resins, (D)CPD/terpene copolymer resins, terpene/phenol copolymer resins, (D)CPD/pinene copolymer resins, pinene/phenol copolymer resins, (D)CPD/C5 fraction copolymer resins, (D)CPD/C9 fraction copolymer resins, terpene/vinylaromatic copolymer resins, terpene/phenol copolymer resins, pinene/vinylaromatic copolymer resins, pinene/phenol resins, C5 fraction/vinylaromatic copolymer resins, and combinations thereof. The phrase "units derived from dicyclopentadiene" includes units derived from substituted DCPD such as methyl DCPD or dimethyl DCPD. The resin can be single or dual-functionalized with a hydrosilylation agent, e.g., with a compound (cyclic or non-cyclic) having a Si—H bond that catalytically reacts with the backbone of resin.

The alkene component of the unmodified resin can be any of aromatic hydrocarbon monomers, non-aromatic hydrocarbon monomers, cyclopentadiene, dicyclopentadiene, $C_4$ monomers, $C_5$ monomers, $C_9$ monomers, isoprene, amylene, piperylene, or derivatives thereof.

Terpenes herein refer to molecules which are derived from units of isoprene, such as multiples of (C5H8)n where n is the number of linked isoprene units with a minimum of n equal to 2. Terpenes may be linear, branched or cyclic. Examples include without limitation α-pinene, β-pinene, δ-3 carene, β-phellandrene and pyrolysates of α-pinene, β-pinene, δ-3 carene, δ-2 carene, turpentine, dipentene, limonene, and combinations thereof. In one embodiment, the terpene is α-pinene.

The phenol herein includes substituted and unsubstituted phenols and derivatives thereof. Examples include without limitation ortho- and para-substituted phenols as well as O-alkylated phenols. In an aspect, O-alkylated phenols comprise phenols derived from the reaction of phenols with terpenes.

In embodiments, the unmodified resin is a terpene phenol resin having a ratio of terpene to phenol ranging from 95:5 to 60:40; a softening point temperature in the range of from 100° C. to 170° C., or from 130° C. to 160° C., or from 145° C. to 155° C.; a $T_g$ in the range of from 95° C. to 105° C., or from 97° C. to 103° C., or from 98° C. to 102° C.

In embodiments, the unmodified resin is a terpene phenol resin having a number average molecular weight (Me) of from 300 Daltons (Da) to 1000 Da, or from 400 Da to 900 Da, or from 400 Da to 800 Da and a weight average molecular weight ($M_w$) of from 600 Da to 1100 Da, or from 700 Da to 1000 Da, or from 750 Da to 900 Da.

In embodiments, the unmodified alkyl phenol is a terpene phenol resin having a melt viscosity (150° C.) of 12000 to 15000 mPa·s.

In embodiments, the unmodified resin is a terpene phenol resin has polydispersity index (PDI) of from 1.25 to 1.45; from 1.3 to 1.4, or from 1.32 to 1.38. PDI is computed as $M_w/M_n$.

Examples of terpene phenol resins for modification include SYLVATRAXX™ 5216, SYLVATRAXX™ 4202, SYLVARES™ TP 2040 and SYLVARES™ TP 7042 from Kraton Chemical; YS resin PX1150N, YS resin PX1250, YS PX1000, YS PX800 from Yasuhara. Besides commercially available terpene phenol resins, other alkylated phenol resins may be used, such as conventional linear and branched phenol novolak resins.

The terpene phenol resin may be prepared by any suitable methodology. For example, a phenol may first be dissolved in an organic solvent such as polar or aromatic solvents that are inert with respect to the reaction (e.g., haloaromatic or haloalkanes). The phenol and solvent may be charged to a reaction vessel in any order or substantially simultaneously with stirring. Once the phenol and solvent are charged and the phenol is dissolved in the solvent, the solution may be distilled azeotropically to remove any water from the solution. After distillation, the solution can be cooled to room temperature under an inert gas atmosphere, such as nitrogen or argon, and a catalyst charged to the reaction vessel. The catalyst may be selected from a wide variety of Lewis acid catalysts such as aluminum halides, titanium halides, boron halides, protic acids, clays and modified clays, and alkyl and phenyl derivatives of boron, aluminum, and titanium halides. When the reaction is substantially complete, as indicated by the absence of an exotherm or temperature rise in the reaction mass, the reaction product mixture may be quenched by stirring in a basic solution, (e.g., sodium carbonate solution) to deactivate the catalyst. After quenching the catalyst, stirring is discontinued and the reaction product is heated to promote separation of the product into an aqueous phase and an organic phase. The aqueous phase and organic phase may be separated or the organic phase may be recovered from the reaction product by extraction or drying techniques. The reaction product is a terpene phenol resin suitable for modification in the present disclosure.

The terpenyl phenol ether resin is prepared to reduce the number of hydroxyl groups by etherification of the unmodified terpene phenol resin. Etherification may be carried out with alkylating agents selected from organic halides, e.g., alkyl halides such as methyl bromide; methyl iodide; ethyl iodide; 1-bromopropane; 1-iodopropane; 1-bromobutane; 1-iodoheptane; 1-bromooctane; 1-iodononane; 1-bromodecane; 1-bromotridecane; 1-bromotetradecane; 1-bromopentadecane; 1-bromohexadecane; and 3-iodoeicosane, and (2-iodoethyl)benzene, in the presence of potassium carbonate and a phase transfer catalyst, for example, 18-crown-6 ether or tetrabutyl ammonium bromide. The etherification reaction can be carried out in the presence of solvents such as acetonitrile, N,N-dimethylformamide, acetone, cyclopentanone, cyclohexanone, methyl isobutyl ketone.

The terpenyl phenol ether resin can also be generated by alkylating phenol ethers such as anisole and diphenyl ether with, for example, alpha-pinene.

The OH value of the modified resin depends on the initial OH value of the unmodified resin, with the OH value in one embodiment ranges from 1 to 50; or from 2 to 25; or from 3 to 10. The modified resin has an OH value of less than 50% of the OH value of the unmodified starting resin; or less than 40%, or less than 25%; or less than 10%.

The modified resin in one embodiment has a $T_g$ from 40° C. to 135° C., from 45° C. to 135° C.; or from 50° C. to 130° C.

The modified alkyl phenol resin is present in the rubber composition in an amount from 5-90 phr, alternatively 8-60 phr, from 10-55 phr, or from 15 to 40 phr, or less than 30 phr.

Optional Second Resin:

The composition may additionally comprise a second resin which is unmodified alkyl phenol resin, which can be the same or different than the unmodified alkyl phenol resin modified to reduce the hydroxyl value and used as the First Resin. The second resin can be any of a terpene-based resin, a hydrocarbon-based resin, a rosin-based resin and combinations thereof.

The second resin can be used in an amount ranging from 5 to 50 phr; alternatively from 10 to 40 phr; or from 15 to 30 phr, based on 100 phr of the rubber coponsent. In one embodiment, the rubber composition includes any of 5, 10, 15, 20, 25, 30, 35, 40, 45 phr of a second resin, or in any range from to or between any two of the foregoing numbers.

Elastomer or Rubber Component:

The term "rubber" or "elastomer" include both natural rubber and its various raw and reclaim forms, as well as various synthetic rubbers.

The rubber component comprises any of unsaturated diene elastomer selected from polybutadienes, natural rubber, synthetic polyisoprenes, butadiene copolymers, isoprene copolymers and the mixtures of such elastomer. Examples include butyl rubber, halogenated butyl rubber, and EPDM (Ethylene Propylene Diene Monomer rubber), and mixtures thereof. In another embodiment, the rubber component is selected from natural rubber (NR), styrene-butadiene rubber (SBR), butadiene rubber (BR), synthetic polyisoprene rubber, epoxylated natural rubber, polybutadiene rubber, nitrile-hydrogenated butadiene rubber HNBR, hydrogenated SBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers. Examples of SBR rubber include an emulsion-polymerized styrene-butadiene rubber (un-modified E-SBR), a solution-polymerized styrene-butadiene rubber (un-modified S-SBR) and modified SBRs obtained by modifying terminals thereof (modified E-SBR and modified S-SBR) can be used.

In embodiments, the rubber component comprises rubber components other than the SBR and the BR such as a natural rubber (NR), an isoprene rubber (IR), an epoxidized natural rubber (ENR), a butyl rubber, an acrylonitrile butadiene rubber (NBR), an ethylene propylene diene rubber (EPDM), a chloroprene rubber (CR) a styrene-isoprene-butadiene rubber (SIBR), used alone or in combinations as needed.

The rubber component may be coupled, star-branched, branched, and/or functionalized with a coupling and/or star-branching or functionalization agent. The branched rubber can be any of branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

In embodiments, the rubber is end-group functionalized to improve its affinity for fillers, such as carbon black and/or silica. In one embodiment, the functionalized rubber made by living polymerization techniques is compounded with sulfur, accelerators, antidegradants, a filler, such as carbon black, silica or starch, and other suitable chemicals. Examples of coupling and/or star-branching or functionalizations include coupling with carbon black as a filler, e.g., with functional groups comprising a C—Sn bond or of aminated functional groups, such as benzophenone; coupling with a reinforcing filler, such as silica, e.g., silanol functional groups or polysiloxane functional groups having a silanol end; alkoxysilane groups, polyether groups.

Examples of the rubber component include a highly unsaturated rubber, end-chain functionalized with a silanol group; a functionalized diene rubber bearing at least on SiOR function, R being a hydrogen or a hydrocarbon radical; or SBR, or SBR and BR for improved wet grip performance. In embodiments, the rubber is epoxide-functionalized (or epoxidized), bearing epoxide functional groups. The epoxidized elastomer can be selected from the group consisting of epoxidized diene elastomers, epoxidized olefinic elastomers and mixtures thereof Fillers:

The term "filler" refers to any material that is used to reinforce or modify physical properties, impart certain processing properties, or reduce cost of an elastomeric composition. Examples of fillers include, but are not limited to, calcium carbonate, carbon nanotube, clay, mica, silica, silicates, talc, titanium dioxide, alumina, zinc oxide, starch, wood flour, carbon black, or mixtures thereof. Other fillers include, but are not limited to, particulate fillers including ultra-high molecular weight polyethylene (UHMWPE), particulate polymer gels, and plasticized starch composite fillers known in the art.

The filler may be uncoated or coated, e.g., with a modified or unmodified modified terpene phenol resin. In one embodiment, the fillers are surface-treated.

The fillers may be any size and typically range from 0.0001 μm-100 μm.

The amount of fillers ranges from 30 to 300 phr, or from 50 to 200 phr, or at least 80 phr.

Coupling Agents:

In embodiments, the rubber composition further comprises coupling agents. The term "coupling agent" is meant to refer to any agent capable of facilitating stable chemical and/or physical interaction between two otherwise non-interacting species, e.g., between a filler such as silica and an elastomer. Coupling agents cause silica to have a reinforcing effect on the rubber. The coupling agents may be premixed, or pre-reacted, with the filler particles or added to the rubber mix during the rubber/silica processing, or mixing, stage. The coupling agent and a filler such as silica can be added separately to the rubber mix during the rubber/silica mixing, or processing stage, for the coupling agent then combines in situ with the filler.

The coupling agent can be any of a sulfur-based agent, an organic peroxide-based coupling agent, an inorganic agent, a polyamine coupling agent, a resin coupling agent, a sulfur compound-based coupling agent, oxime-nitrosamine-based coupling agent, and sulfur.

In one embodiment, the coupling agent is at least bifunctional, examples include organosilanes or polyorganosiloxanes. Other examples of suitable coupling agents include silane polysulfides, referred to as "symmetrical" or "unsymmetrical" depending on their specific structure. The coupling agent can also be bifunctional POSs (polyorganosiloxanes), or hydroxysilane polysulphide, or an alkoxysilane or polysulphurized alkoxysilane, e.g., polysulphurized alkoxysilane. The coupling agent can also include other silane sulphides, for example, silanes having at least one thiol (—SH) functional group (referred to as mercaptosilanes) and/or at least one masked thiol functional group. The coupling agent can also include combinations of one or more coupling agents described herein.

Coupling agent if present, ranges between 2 and 20 phr, or between 3 and 15 phr.

Optional Plasticizer:

"Plasticizer" (also referred to as a processing oil), refers to a petroleum derived processing oil and synthetic plasticizer to extend elastomers and improve the processability of the composition. Suitable plasticizers include, but are not limited to, aliphatic acid esters, hydrocarbon processing oils, tall oil pitch and modified tall oil pitch, and combinations thereof.

In embodiments, the plasticizer is a modified tall oil pitch selected from the group of a pitch ester, a decarboxylated tall oil pitch, a soap of tall oil pitch, a thermally treated tall oil pitch, and a thermally and catalytically treated tall oil pitch.

In embodiments, the plasticizer includes both extending oil present in the elastomers, and process oil added during compounding. Suitable process oils include aromatic, paraffinic, naphthenic, and low PCA oils, such as MES, TDAE, and heavy naphthenic oils, and vegetable oils such as sunflower, soybean, and safflower oils. Examples of low PCA oils include those having a polycyclic aromatic content of less than 3 percent by weight. Suitable vegetable oils include, for example, soybean oil, sunflower oil and canola oil which are in the form of esters containing a certain degree of unsaturation.

The amount of plasticizer is present in an amount of 0-25 phr, or 5 to 15 phr. In embodiments, the plasticizer is present in an amount of weight ratio of resin to plasticizer greater than 1. In a second one embodiment, the weight ratio of resin to plasticizer is greater than 3. In a third embodiment, greater than 6.

Cross-Linking Agents:

In one embodiment and depending on the rubber component used, the rubber component in the composition may be crosslinked by adding curative agents, for example sulfur, metals, metal oxides such as zinc oxide, peroxides, organometallic compounds, radical initiators, fatty acids, and other agents common in the art. Zinc oxide, typically at 5 phr, is added to form zinc halide that then acts as the catalyst for the vulcanization of the rubber compounds. Other known methods of curing that may be used include, peroxide cure systems, resin cure systems, and heat or radiation-induced crosslinking of polymers. Accelerators, activators, and retarders may also be used in the curing process.

The cross-linking agent content is preferably between 0.3 and 10 phr in one embodiment, or between 0.5 and 5.0 phr, or at least 0.5 phr.

Other Additives:

The composition can be compounded with other components known in the art in amounts of up to 10 phr, e.g., sulfur donors, curing aids, such as accelerators, activators and retarders and processing additives, pigments, fatty acid, zinc oxide, waxes, antioxidants and antiozonants and peptizing agents.

Methods for Forming:

The rubber composition can be formed by methods known to those having skill in the rubber mixing art. For example, the components are typically mixed in two or more stages, for example, at least one non-productive stage followed by a productive mix stage. The final curatives, e.g., a cross-linking system such as sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

In embodiments for use in tire applications, the composition may be prepared by contacting the components in the order listed and mixing the materials using a suitable mixer to break down the rubber bale, fillers, and chemicals and mix them with other ingredients. The curative package is normally added in the final stage of mixing. Once the mixing is completed, the batch is sent through a series of machines to form it into a continuous sheet called a "slap." The slap is then transferred to other areas for bead wire assembly preparation, innerliner calendering, steel and/or fabric belt/ply cord calendering, tire sidewall extrusion, and tire tread extrusion. An exemplary mixing protocol is provided in the examples.

An example is presented in Table 3 which represents the first stage of a three stage mixing protocol. The second stage is the remilling of the mixture resultant from the first stage and the final stage is the mixing of the resultant compound from the second stage with the remaining curatives.

Industrial Applicability:

Rubber compositions with the modified alkyl phenol resin can be used in formulating articles, such as tires, that display improved performance characteristics such as enhanced wet grip and decreased rolling resistance and improving abrasion. In embodiments, the rubber composition is processed into vehicle tires or components thereof (e.g., surface tread components), useful for passenger car tire treads, especially for low-rolling resistance tires.

It has been shown that the OH functionality of resins influences the balance between improving wet traction without compromise of rolling resistance, with a higher OH value may result in a negative impact. The modification or conversion of free OH functions into ethers in the disclosure is a way to minimize the OH value, with the reduced polarity of the ether compared to the original free OH functions.

The rubber composition with modified alkyl phenol resin can also be used for other tire types such as winter tires, summer tires, all season tires high performance (HP) and ultra-high performance tires (UHP), tires for light trucks, trucks, buses, off-the road (OTR) tires, airplane tires and two wheelers such as motorbikes, scooters, bicycles. Besides tire applications, the composition can be extruded, compression molded, blow molded, injection molded, and laminated into various shaped articles including fibers, films, laminates, layers, industrial parts such as automotive parts, appliance housings, consumer products, packaging, and the like.

Additionally, the modified alkyl phenol resins disclosed herein may be used in conjunction with one or more polymers to form an adhesive, such a hot-melt adhesive, a pressure sensitive adhesive or a pressure sensitive dispersion adhesive. The polymer can be, for example, a polyacrylate, a polyolefin, a polyamide, a polyvinyl ether, a polyurethane, a polyester, a polyvinyl ester, a copolymer thereof, or a blend thereof Properties:

The modified alkyl phenol resin has a $T_g$ ranging from 40° C. to 170° C., or at least 50° C.; or from 40 to 135° C. The modified alkyl phenol resin has a softening point from 50° C. to 220° C., or at least 75° C., or at least 90° C., or less than 180° C., or from 50 to 200° C. The modified alkyl phenol resin is characterized as having a hydroxyl value in a range of 0 to 50, or less than 40, or between 3 and 20, or between 5 and 15, or less than 20.

Tire rubber compositions with the modified alkyl phenol resin show significant reduction in rolling resistance and improvement in wet grip performance, as compared to compositions with an equal amount of the unmodified resin. With respect to reduction in rolling resistance, tire compositions with the modified resin has a tan δ at 60° C. that is at least at least 5% less, or at least 10% less, or at least 15% less than the tan δ at 60° C. for a composition with an equal amount of the unmodified starting resin. With respect to improved wet traction (wet grip properties), the tire composition shows at least 5% improvement in tan δ at 0° C., or at least 10%, or at least 15% improvement than tan δ at 0° C. for a composition with the unmodified starting resin.

In embodiments, the tire rubber composition has a tan δ at 60° C. of 0.20 or less, or between 0.12 to 0.20, or less than 0.18, or less than 0.16, or less than 0.14. In embodiments, the tire rubber compositions have a tan δ at 0° C. of at least 0.50, or at least 0.57, or between 0.58 to 0.65, or at least 0.60.

In embodiments, tire compositions with the modified resin has a DIN abrasion value improvement of at least 15%, or at least 20%, or at least 30%, over the DIN abrasion value of a comparable composition containing an unmodified alkyl phenol resin. In embodiments, the composition has a DIN abrasion relative volume loss of less than 90 mm$^3$, or less than 85 mm$^3$, or less 80 mm$^3$, or from 60 to about 70 mm$^3$.

EXAMPLES

The Following Illustrative Examples are Intended to be Non-Limiting.

Examples—Preparation of a Modified Terpene Phenol Resin

Modification of unmodified alkyl phenol resin was assessed by modification of several terpene phenol resins (unmodified resin 1-4) all available from Kraton Chemical with their properties in Table 2. The OHV is analyzed by hydroxyl value titration according to ASTM E222. Tsp is determined according to ASTM D6090 Cup and Ball softening point. Tg is determined according to ASTM D6604.

The terpene phenol resins were modified by O-alkylation via Williamson ether synthesis. The terpene phenol resin was charged to the reactor in combination with 10 molar equivalent of potassium carbonate to mols of hydroxyl groups in the resin, 2 to 3 crystals of 18-crown-6 ether and dissolved in acetone or cyclohexanone (dried over sodium sulfate). Once the resin was dissolved, a 3 molar equivalent of 1-iodopropane to mols of hydroxyl groups in the resin was added slowly. The reaction mixture was heated to reflux temperature in the case of acetone solvent, or 80° C. in the case of cyclohexanone solvent. Reaction was allowed to continue for a total reaction time of 24 hours. Upon completion of the 24 hour reaction time, the solvent was removed. The modified terpene phenol resin dissolved in toluene and water was added to dissolve the potassium carbonate. The resin solution was washed. The toluene solvent was removed via distillation by heating to 200° C., after which the molten resin was discharged from the reactor.

Example 1

A reactor flask was equipped with a reflux cooler, nitrogen inlet and temperature probe. 20.0 grams of Unmodified Resin 1 and 10 gram of potassium carbonate (K$_2$CO$_3$) were added with 2 small crystals of 18-crown-6 ether, followed by 68 gram of acetone (dried over sodium sulfate). After addition, the mixture was stirred until the terpene phenol was dissolved. 5.5 gram 1-iodopropane was added by a dropping funnel. The reaction was heated to gentle reflux for 24 hours. During the night the reaction was not heated. The reaction mixture was cooled down and the acetone evaporated under nitrogen flow. Toluene was added to dissolve the resin and then water was added to dissolve the potassium carbonate.

The resin solution was washed with water five times. The toluene solvent was removed via distillation by heating to 200° C., after which the molten resin was discharged from the reactor. Modified resin A was obtained with OHV of 6 mgKOH/g and Tsp of 142° C. Modified resin B through F were obtained in a similar fashion with the conditions as listed in table 1.

Example 2

A reactor flask was equipped with a reflux cooler, nitrogen inlet and temperature probe. 20.0 grams of Unmodified Resin 1 and 10 gram of potassium carbonate ($K_2CO_3$) were added with 2 small crystals of 18-crown-6 ether, followed by 100 gram of cyclohexanone (dried over sodium sulfate). After addition, the mixture was stirred until the terpene phenol was dissolved. 4.2 gram 1-iodopropane was added by a dropping funnel. The reaction was heated to 80° C. for 24 hours. During the night the reaction was not heated. The reaction mixture was cooled down and toluene was added to dissolve the resin and then water was added to dissolve the potassium carbonate. The resin solution was washed with water five times. The cyclohexanone and toluene solvents were removed via distillation by heating to 200° C., after which the molten resin was discharged from the reactor. Modified resin G was obtained with OHV of 9 mgKOH/g and Tsp of 142° C.

Table 1 summarizes the starting material, reactants, solvents, reaction conditions required to prepare modified terpene phenol resins (product).

unmodified terpene phenol resins (starting material). Results obtained by hydroxyl value titration confirmed the decrease in OHV of the modified terpene phenol resin (product) as compared to the unmodified terpene phenol resin. In some experiments, different solvents, e.g., cyclohexanone, were used to reduce the OH-value at a higher temperature.

Examples—Preparation of Rubber Composition

Unmodified resin 1 and 3, as well as modified resin E and F were incorporated into tire tread rubber compositions for testing of the performance. A pure monomer resin, Compound A (styrene-alpha-methylstyrene copolymer resin) having a Mw=1,300 g/mol, Mc=2,018 g/mol; softening point=85° C. was also incorporated into the tire tread rubber composition as a reference. The formulations are presented in Table 3 below. The formulations were mixed in a 379 ml Banbury type internal mixer according to the 3 stage mixing protocol described below.

Stage I

| Step # | Action | Time (min) | Speed (rpm) | Temp (° C.) |
|---|---|---|---|---|
| 1 | Add polymer | 0.5 | 60 | 75 |
| 2 | Masticate | 1 | 60 | |
| 3 | Add $1^{st}$ shot | 0.5 | 60 | |
| 4 | Masticate | 1 | 60 | |

TABLE 1

| Product (modified terpene phenol resin) | Starting material (unmodified terpene phenol resins) | 1-iodopropane | $K_2CO_3$ | Reaction temperature | Time hrs. | Solvent |
|---|---|---|---|---|---|---|
| Modified resin A | 20 g Unmodified Resin 1 | 5.5 g | 10 g | Reflux | 24 | 68 g Acetone |
| Modified resin B | 20 g Unmodified Resin 2 | 4.4 g | 12 g | Reflux | 24 | 64 g Acetone |
| Modified resin C | 20 g Unmodified Resin 3 | 20.6 g | 56 g | Reflux | 24 | 64 g Acetone |
| Modified resin D | 50 g Unmodified Resin 4 | 34.6 g | 94 g | Reflux | 24 | 200 g Acetone |
| Modified resin E | 100 g Unmodified Resin 1 | 19.5 g | 52 g | Reflux | 24 | 315 g Acetone |
| Modified resin F | 100 g Unmodified Resin 3 | 104.0 g | 281 g | Reflux | 24 | 315 g Acetone |
| Modified resin G | 20 g Unmodified Resin 1 | 4.2 g | 10 g | 80° C. | 24 | 100 g Cyclohexanone |

Table 2 presents the OHVs, Tg, and Tsp for the unmodified resins and final products, and yields from the reaction.

TABLE 2

| Product | OHV (mgKOH/g) | Tg (° C.) | Tsp (° C.) | Yield (%) |
|---|---|---|---|---|
| Unmodified Resin 1 | 21 | 96.3 | 152 | — |
| Unmodified Resin 2 | 24 | 62.4 | 115 | — |
| Unmodified Resin 3 | 114 | 70.2 | 119 | — |
| Unmodified Resin 4 | 76 | 97.5 | 148 | — |
| Modified resin A | 6 | 86.0 | 142 | 92.0 |
| Modified resin B | 3 | 55.0 | 124 | 92.5 |
| Modified resin C | 5 | 51.9 | 103 | 97.0 |
| Modified resin D | 16 | 75.2 | 129 | 72.4 |
| Modified resin E | 11 | 83.4 | 141 | 95.3 |
| Modified resin F | 10 | 40.3 | 95 | 98.7 |
| Modified resin G | 9 | 88.8 | 142 | 87.1 |

From the results, it can be seen that the etherification reactions were successful in lowering the OHV of the -continued

| Step # | Action | Time (min) | Speed (rpm) | Temp (° C.) |
|---|---|---|---|---|
| 5 | Add $2^{nd}$ shot | 0.5 | 60 | |
| 6 | Masticate | 1 | 60 | |
| 7 | Add $3^{rd}$ shot | 0.5 | 60 | |
| 8 | Masticate | 0.5 | 60 | |
| 9 | Ram raise | 0.1 | 60 | |
| 10 | To temp | | 100 | 150 |

Stage II

| Step # | Action | Time (min) | Speed (rpm) | Temp (° C.) |
|---|---|---|---|---|
| 1 | Add NP1 | 0.5 | 90 | 75 |
| 2 | To temp | | 120 | 145 |
| 3 | Salinize | 4 | Variable | 145-150 |

Stage III

| Step # | Action | Time (min) | Speed (rpm) | Temp (° C.) |
|---|---|---|---|---|
| 1 | Add remill | 0.5 | 55 | 75 |
| 2 | Masticate | 0.3 | 55 | |
| 3 | Add curatives | 0.3 | 55 | |
| 4 | To temp | | 55 | 100 |

TABLE 3

| Component | Compound A (phr) | Compound B (phr) | Compound C (phr) | Compound D (phr) | Compound E (phr) |
|---|---|---|---|---|---|
| SSBR (Buna™ 4526-2) | 48.12 | 48.12 | 48.12 | 48.12 | 48.12 |
| BR (Buna™ CB24) | 30 | 30 | 30 | 30 | 30 |
| SSBR (Sprintan™ SLR 4602) | 35 | 35 | 35 | 35 | 35 |
| Ultrasil™ 7000 GR (SA165) | 80 | 80 | 80 | 80 | 80 |
| Carbon black - N234 | 5 | 5 | 5 | 5 | 5 |
| Silane Si-69™ | 8 | 8 | 8 | 8 | 8 |
| Zincoxide RS™ | 3 | 3 | 3 | 3 | 3 |
| Stearic acid | 2 | 2 | 2 | 2 | 2 |
| Vulkanox™ 4010 (IPPD/antidegradant) | 1 | 1 | 1 | 1 | 1 |
| Vulkanox™ 4020 (6PPD/antidegradant) | 2 | 2 | 2 | 2 | 2 |
| Vulkanox™ HS (TMQ/antioxidant) | 0.5 | 0.5 | 0.5 | 0.5 | 0.5 |
| Antilux 654 (wax) | 1 | 1 | 1 | 1 | 1 |
| Compound A Comparative | 20 | | | | |
| Unmodified resin 1 Comparative | | 20 | | | |
| Unmodified resin 3 Comparative | | | 20 | | |
| Modified resin E | | | | 20 | |
| Modified resin F | | | | | 20 |
| Curatives | | | | | |
| Rhenogran™ CBS-80 | 1.9 | 1.9 | 1.9 | 1.9 | 1.9 |
| Rhenogran™ DPG-80 | 2.5 | 2.5 | 2.5 | 2.5 | 2.5 |
| Rhenogran™ IS 90-65 | 2.3 | 2.3 | 2.3 | 2.3 | 2.3 |
| Total: | 242.32 | 242.32 | 242.32 | 242.32 | 242.32 |

Determination of tan δ was carried out by Dynamic Mechanical Analysis (DMA) in temperature-sweep/mode in double shear mode from −60° C. to +100° C. with a heat rate of 1° C./min at 10 Hz, and a dynamic strain of 0.1% (from −60° C. to −5° C.) and a dynamic strain of 3% (from −5° C. to 100° C.) using a Metravib +450N. The wet grip indicator commonly used is tan δ at 0° C. (tan δ 0° C.) and the rolling resistance indicator commonly used is tan δ at 60° C. (tan δ δ 0° C.).

Properties such as tensile strength, elongation, and modulus were measured following procedures described in ISO 37. DIN abrasion resistance was measured according to ISO 4649 using a DIN abrasion tester.

TABLE 4

| Property | Compound A Unmodified | Compound B Unmodified resin 1 | Compound C Unmodified resin 3 | Compound D Modified resin E | Compound E Modified resin F |
|---|---|---|---|---|---|
| Tan δ at 0° C. | 0.600 | 0.632 | 0.529 | 0.632 | 0.597 |
| Tan δ at 60° C. | 0.162 | 0.172 | 0.291 | 0.167 | 0.162 |
| Normalized tan δ at 0° C. % | 100 | 105 | 88 | 105 | 100 |
| Normalized tan δ at 60° C. % | 100 | 106 | 180 | 103 | 100 |
| Elongation at break % | 430 | 460 | 470 | 490 | 450 |
| Tensile MPa strength | 20.0 | 20.1 | 20.5 | 22.3 | 19.8 |
| Modulus MPa 50% | 1.5 | 1.5 | 1.6 | 1.4 | 1.4 |
| Modulus MPa 100% | 2.7 | 2.5 | 2.7 | 2.5 | 2.4 |

TABLE 4-continued

| Property | Compound A Unmodified | Compound B Unmodified resin 1 | Compound C Unmodified resin 3 | Compound D Modified resin E | Compound E Modified resin F |
|---|---|---|---|---|---|
| Modulus MPa 300% | 12.2 | 11.1 | 11.4 | 11.5 | 11.1 |
| Modulus MPa 300%/100% | 4.6 | 4.5 | 4.3 | 4.7 | 4.6 |
| DIN abrasion mm³ relative volume loss | 90.2 | 98.2 | 105.5 | 73.3 | 89.4 |

The reduction in OHV of unmodified resin 3 by etherification leads to a strong improvement in rolling resistance and an increase in wet grip performance when used in the tire tread formulation in Table 3, as the wet grip and rolling resistance performance indicators (at tan δ at 0° C. and tan δ at 60° C.) of compound E have strongly improved when compared to the wet grip and rolling resistance performance indicators of compound C.

Modification of unmodified resin 1 by etherification has resulted in an improvement in DIN abrasion resistance when used in the tire tread formulation in Table 3, as the DIN abrasion relative volume loss was reduced for compound D compared to compound B.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:
1. A composition comprising a blend of:
a rubber component and based on 100 parts by weight (phr) of the rubber component;
from 50 to 200 phr of a filler;
from 0 to 25 phr of a plasticizer;
from 5 to 75 phr of a modified alkyl phenol resin having a $T_g$ from 40° C. to 135° C., a softening point from 50° C. to 200° C., and a hydroxyl value in a range of 0 to 50;
wherein the modified alkyl phenol resin is prepared via any of:
a post polymerization modification of an unmodified alkyl phenol resin to covert phenolic OH groups of the unmodified alkyl phenol resin to an ether-group with an alkylating agent, thereby further reducing the OH groups by at least 20 mol %; or
polymerizing anisole, diphenyl ether or combinations thereof, with terpene, styrene, isoprene, dicyclopentadiene, vinyl aromatic, unsaturated olefin or combinations thereof.

2. The composition of claim 1, wherein the alkylating agent is an alkyl halide.

3. The composition of claim 2, wherein the alkyl halide is selected from 1-iodopropane and 1-chloropropane.

4. The composition of claim 1, wherein the modified alkyl phenol resin is a terpene phenol ether.

5. The composition of claim 1, wherein the unmodified alkyl phenol is a terpene phenol resin having a ratio of terpene to phenol ranging from 95:5 to 60:40, a softening point temperature in the range of from 100° C. to 170° C., a number average molecular weight (Mn) of from 300 Daltons (Da) to 1000 Da, and a polydispersity index (PDI) of from 1.25 to 1.45.

6. The composition of claim 1, wherein the unmodified alkyl phenol is a terpene phenol resin having a melt viscosity (150° C.) of 12000 to 15000 mPas.

7. The composition of claim 1, wherein the unmodified alkyl phenol comprises terpenyl as its alkyl moiety.

8. The composition of claim 1, wherein the modified alkyl phenol resin is derived from a substituted phenol, an unsubstituted phenol or both.

9. The composition of claim 1, wherein the modified alkyl phenol resin comprises aromatic hydrocarbon monomers, non-aromatic hydrocarbon monomers, cyclopentadiene, dicyclopentadiene, C4 monomers, C5 monomers, C9 monomers, isoprene, amylene, piperylene, or derivatives thereof.

10. The composition of claim 1, wherein the modified alkyl phenol resin comprises α-pinene, β-pinene, D-limonene, dipentene (racemic limonene), δ-3 carene, β-phellandrene and pyrolysates of α-pinene, β-pinene, δ-3 carene, δ-2 carene, turpentine, or combinations thereof.

11. The composition of claim 1, wherein the composition further comprises a coupling agent selected from the group of: a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur.

12. The composition of claim 1, wherein the rubber component is selected from the group of natural rubber (NR), styrene-butadiene rubber (SBR), butadiene rubber (BR), synthetic polyisoprene rubber, epoxylated natural rubber, polybutadiene rubber, nitrile-hydrogenated butadiene rubber NHBR, hydrogenated styrene-butadiene rubber HSBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methyl styrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

13. A tire comprising the composition of claim 1.

14. A method for preparing a rubber composition comprising
mixing a rubber component and based on 100 parts by weight (phr) of the rubber component,
from 50 to 200 phr of a filler,
from 0 to 25 phr of a plasticizer,
from 5 to 75 phr of a modified alkyl phenol resin having a $T_g$ from 40° C. to 135° C., a softening point from 50° C. to 200° C., and a hydroxyl value in a range of 0 to 50,
wherein the modified alkyl phenol resin is prepared via a post polymerization modification of an unmodified alkyl phenol resin to covert phenolic OH groups of the unmodified alkyl phenol resin to an ether-group with an alkylating agent, thereby further reducing the OH groups by at least 20 mol %; or
wherein the modified alkyl phenol resin is prepared by polymerizing anisole, diphenyl ether or combinations thereof, with terpene, styrene, isoprene, dicyclopentadiene, vinyl aromatic, unsaturated olefin or combinations thereof;
thermomechanically kneading the mixture; and
incorporating a cross-linking system.

15. The tire of claim 13, wherein the tire has a DIN abrasion value improvement of at least 15% over the DIN abrasion value of a tire comprising an equal amount of an unmodified alkyl phenol resin.

16. The tire of claim 13, wherein the tire has a reduction in rolling resistance expressed as tan δ at 60° C. of at least 5% less the tan δ at 60° C. of a tire comprising an equal amount of an unmodified alkyl phenol resin.

17. The tire of claim 13, wherein the tire has an increase in wet grip resistance expressed as tan δ at 0° C. of at least 5% more than the tan δ at 0° C. of a tire comprising an equal amount of an unmodified alkyl phenol resin.

18. The tire of claim 13, wherein the tire has a rolling resistance expressed as tan δ at 60° C. of less than 0.20 and a tan δ at 0° C. of at least 0.50.

19. The composition of claim 1, wherein the alkylation agent is selected from the group of alkyl halides such as methyl bromide; methyl iodide; ethyl iodide; 1-bromopropane; 1-iodopropane; 1-bromobutane; 1-iodoheptane; 1-bromooctane; 1-iodononane; 1-bromodecane; 1-bromotridecane; 1-bromotetradecane; 1-bromopentadecane; 1-bromohexadecane; and 3-iodoeicosane, and (2-iodoethyl) benzene, in the presence of potassium carbonate and a phase transfer catalyst, for example, 18-crown-6 ether and tetrabutyl ammonium bromide.

20. The composition of claim 1, wherein the etherification reaction is carried out in the presence of a solvent selected from acetonitrile, N,N-dimethylformamide, acetone, cyclopentanone, cyclohexanone, or methyl isobutyl ketone.

* * * * *